Feb. 7, 1961
G. MACIUNAS
2,970,676
FRAMEWORK CONSTRUCTION
Filed Jan. 27, 1958
3 Sheets-Sheet 1
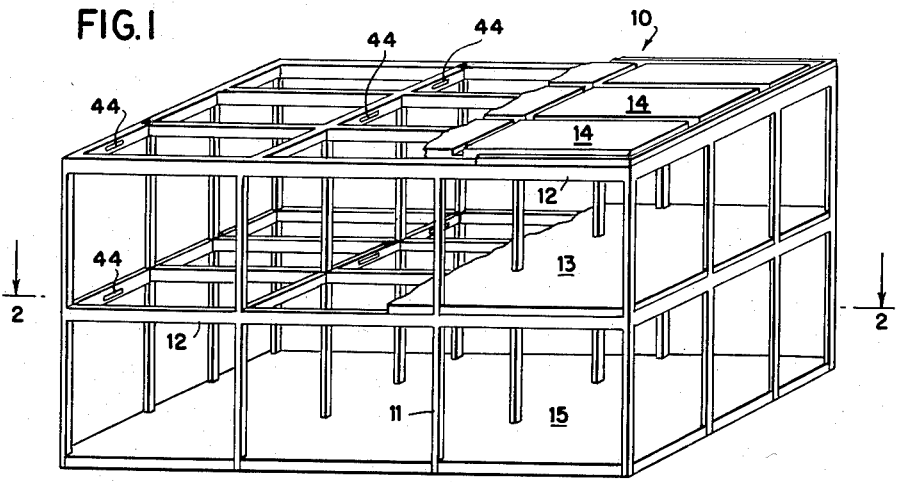
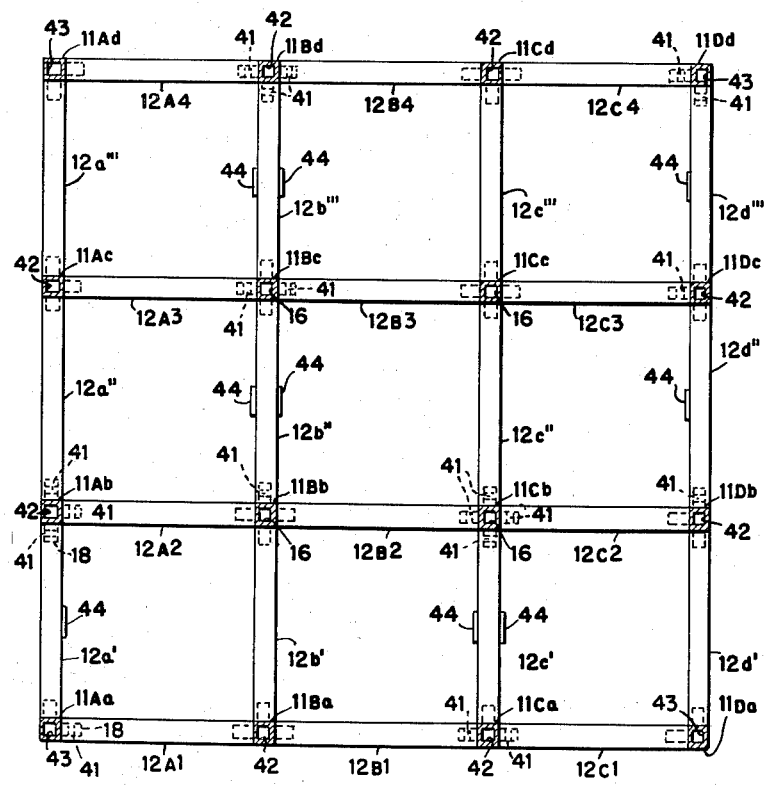
INVENTOR.
George Maciunas
BY
Adams, Forward and McLean
ATTORNEYS Feb. 7, 1961 G. MACIUNAS 2,970,676
FRAMEWORK CONSTRUCTION
Filed Jan. 27, 1958 3 Sheets-Sheet 2
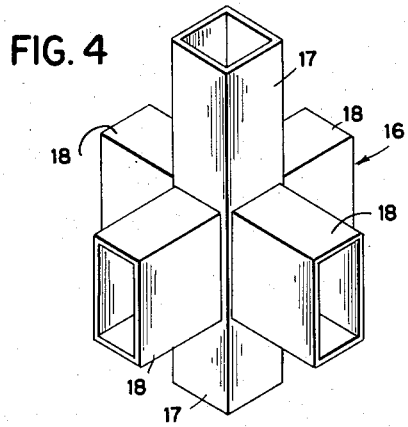
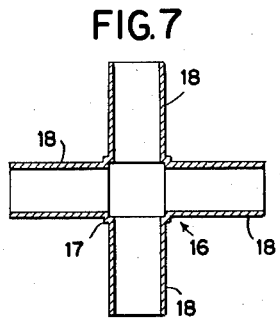
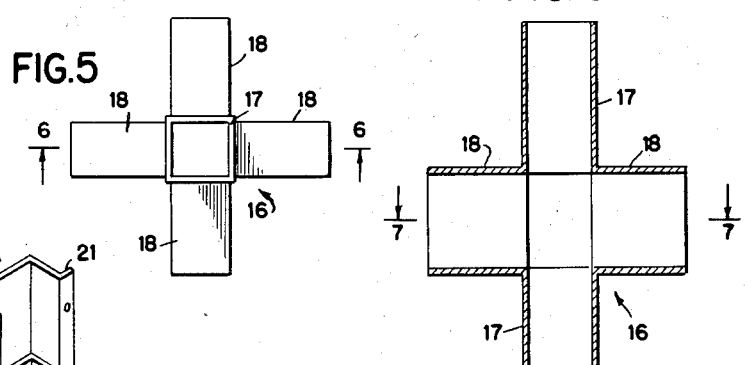
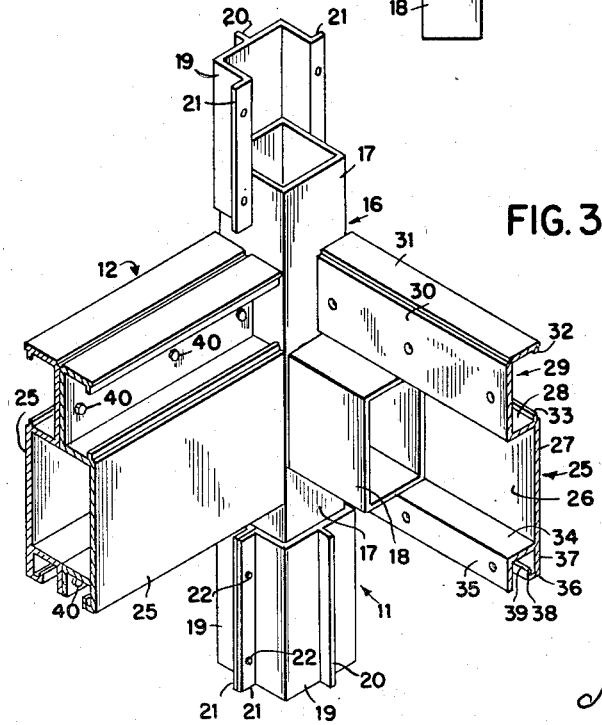
INVENTOR.
George Maciunas
BY
Adams, Forward and McLean
ATTORNEYS Feb. 7, 1961 G. MACIUNAS 2,970,676
FRAMEWORK CONSTRUCTION
Filed Jan. 27, 1958 3 Sheets-Sheet 3

INVENTOR.
George Maciunas
BY
Adams, Forward and McLean
ATTORNEYS

United States Patent Office 2,970,676
Patented Feb. 7, 1961

2,970,676

FRAMEWORK CONSTRUCTION

George Maciunas, New York, N.Y., assignor to Olin Mathieson Chemical Corporation, New York, N.Y., a corporation of Virginia Filed Jan. 27, 1958, Ser. No. 711,449

1 Claim. (Cl. 189—1)

This invention relates to building construction and in particular provides a structural framework useful in construction of pre-fabricated buildings and the like.

It is a general purpose of this invention to provide a structural framework for a building employing extruded aluminum beams and columns thereby taking advantage of the light weight, strength and ease of fabrication of aluminum structural members.

Within this general purpose it is an important object of this invention to provide a structural framework of a building or the like combining mechanical, electrical, structural and architectural features characterized by ease of construction of the framework and simplicity of installation of fixed and sliding exterior panels and interior partitions.

It is also an important object of the invention to provide a structural framework including a network of passages built into the beams and columns which are connected to provide ducts for heating and ventilating and through which electrical conduits can be passed thereby avoiding the necessity of carrying conduits through flooring, panels and partitions.

It is yet another object of this invention to provide roof leaders for roof drainage through the framework of the structure.

It is still a further object of this invention to provide perimeter light troffers for each room in the building as a part of the structural framework of the building.

These and other objects of the invention are basically obtained by providing hollow beams and columns which are interconnected at their ends through hollow joint members, such that the entire framework of the building carries intercommunicating passages which can be selectively blocked off to define air ducts and roof leaders and through which all electrical conduits can be passed.

In a more specific aspect the beams, while taking advantage of the well known I-beam shape, are modified to provide a central hollow portion which with the flange along the top of the beam defines a recess, i.e., troffer, running lengthwise on each side of the beam in which lighting fixtures can be installed. The I-beam construction is further modified along the bottom by extending the sides of the central hollow portion to the bottom of the beam where they are turned toward each other to form the flange along the bottom while defining with the underside of the central hollow portion a pair of recesses in the edge of the beam in which tracks can be installed for sliding panels and partitions and from which fixed partitions and panels can be hung.

For a more complete understanding of the principles of this invention reference is made to the appended drawings in which:

Figure 1 is a perspective view of a partially completed building structure embodying the principles of this invention;

Figure 2 is a cross-section of the structure shown in Figure 1 taken intermediate of the second floor and roof structure showing the second flooring removed;

Figure 3 is a fragmentary isometric view of a joint between columns and beams in the structure of Figure 1;

Figure 4 is an isometric view of a joint member such as shown in Figure 3;

Figure 5 is a plan view of joint member shown in Figure 4;

Figure 6 is a vertical section taken at line 6—6 in Figure 5;

Figure 7 is a cross-section taken at line 7—7 in Figure 6;

Figure 8:
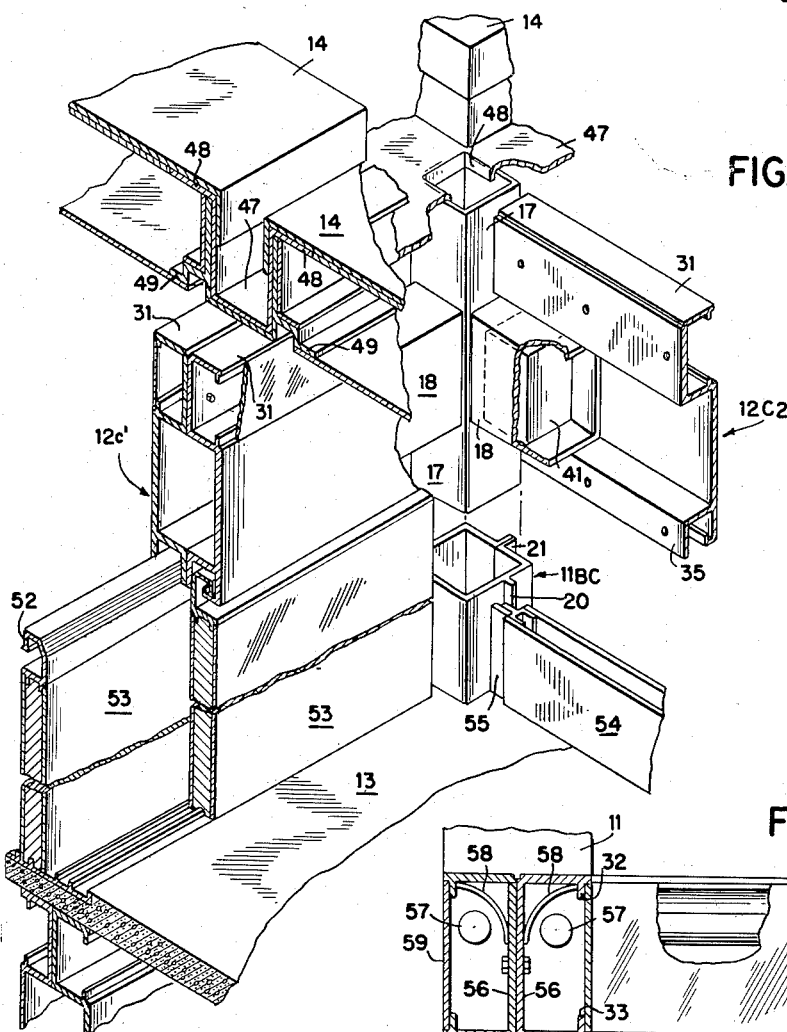
Figure 8 is a fragmentary isometric view of a portion of the completed building structure.

Referring to Figure 1 there is illustrated the framework construction of a building 10 including supporting columns 11 which are spanned by beams 12 supporting the second floor slab 13 and roof slabs 14. In Figure 1 for the sake of clarity the concrete second floor slab 13 is shown partially cut away as also are the concrete roof slabs 14. The concrete, first floor slab 15, however, is shown completely. All exterior panels and interior partitions are removed.

Referring for the moment more particularly to Figure 3 the constructional details of columns 11 and beams 12 are shown. Figure 3 and also Figures 4–7 also illustrate the details of the joint member 16 which joins columns 11 rising between the first and second floors to the columns 11 rising between the second floor and roof and which also joins columns 11 to the various beams 12.

Suitably joint member 11 is an aluminum casting and includes an open-ended, hollow, vertical post having essentially a square cross-section and which is designated by the reference numeral 17. Post 17 at a location somewhat below its center carries four hollow studs 18 which extend outward horizontally, one from each face of post 17. The outer ends of studs 18 are open, and at their inner ends where studs 18 are joined to post 17 they open into the hollow interior of post 17 as can be seen most clearly in Figures 6 and 7.

Again referring more particularly to Figure 3, each column 11 is constructed suitably of two identical pieces 19 of extruded aluminum. Each extruded column piece 19 has basically a channel shape with an integral flange 20 extending outwardly and running centrally along piece 19. A pair of flanges 21 also extends lengthwise along the outer edges of extruded piece 19 with one flange 21 running along each such edge turned outwardly away from piece 19 and aligned in the same plane with the other such flange 21.

Columns 11 are constructed by placing two such aluminum pieces 19 with their flanges 21 abutting. These are then bolted together as indicated by the reference numerals 22 at intervals along the lengths of flanges 21 to complete the structure of each column 11. It will be noted column 11 thus includes an outwardly extending flange running centrally along each face for the purposes of giving column 11 rigidity and added resistance to bending and of providing anchorages for fixed panels and partitions.

Each beam 12 is similarly constructed of two identical extruded aluminum pieces 25 which are bolted together back to back in the same manner as the aluminum pieces 19 are bolted together to form columns 11.

Each beam piece 25 basically includes a channel 26 with its bottom 27 normally lying in a vertical plane. The upper side wall 28 of channel 26 thus in normal position lies in a horizontal plane and at its edge removed from bottom 27 carries an angle 29, one side 30 of which extends vertically upward from side wall 28 of channel 26. The other side 31 of angle 29 extends horizontally from the upper edge of side 30 and is spaced directly over side wall 28 of channel 26.

A small boss 32 extends lengthwise along the underside of side 31 of angle 29 set back a short distance from the outer edge of side 31. A similar boss 33 extends lengthwise along the upper side of side wall 28 of channel 26 directly beneath boss 32 and is thus similarly set back from the outer face of bottom 27 of channel 26.

The lower side wall 34 of channel 26 extends horizontally directly beneath upper side wall 33 such that its edge remote from bottom 27 of channel 26 lies directly beneath the corresponding edge of upper side wall 28. From its edge remote from bottom 27 lower side wall 34 carries a vertical depending flange 35 which lies in the same plane as side 30 of angle portion 29 of beam piece 25.

From their common edges bottom 27 and lower side wall 34 carry a depending angle 36 of which one side 37 attached to lower side wall 34 of channel 26 extends vertically downward from channel 26 the same distance as flange 35. The other, lower side 38 of angle 36 lies in a horizontal plane and extends partly across the space toward the lower edge of flange 35. At its edge nearer flange 35 side 38 carries an upwardly turned boss 39 which extends lengthwise of beam piece 26.

Beams 12 are constructed by placing two such beam pieces 25 back to back, that is with the sides 30 of their angle portions 29 abutting and with their flanges 35 abutting. The two beam pieces 25 are secured by bolting sides 30 and flanges 35 at intervals as indicated by the reference numerals 40.

Still referring more particularly to Figure 3 it will thus be seen that the framework construction of Figure 1 is joined together by positioning the lower ends of posts 17 of the various joint elements 16 in the upper ends of the various upright columns 11. The various beams 12 are then positioned with their ends over studs 18 on joint elements 16. At this point it should be observed that gasketing may be employed to provide an air and water tight seals between the columns and joint elements and between the beams and joint elements. Similarly gasketing can be employed between the flanges 21 of column pieces 19 as these are put together to construct columns 11 and between the abutting faces of the various beam pieces 25. The joint elements can then be bolted to the various columns and beams to secure the construction. Where additional super structure is contemplated requiring columns 11 to rise above joints 16 this is added by then positioning the columns 11 of the super structure over the upper ends of posts 17 with gasketing and bolting if required.

Referring more particularly to Figure 1 it will also be observed that around the perimeter of the building joint elements 16 will have one unused stud 18 in the case of intermediate columns 11 and two unused studs 18 in the case of corner columns 11. In this case the unused studs 18 can be removed by sawing and capped with a cover or alternatively additional joint elements can be provided having only three or two studs 18 as the case may require.

When the framework of building 10 has thus been completed by assembling column 11 and beams 12 with joint members 16 as indicated above, the structure is completed by providing concrete floors 13, 15 and by capping with roof slabs 14 as will be described later. Thereafter panels and partitions are hung where desired, also as will be described later.

When the framework is erected it will be evident, since all beams and columns are hollow and since all joint members are hollow and provide communication between their adjoined beams and columns, that the entire framework of building 10 is thus a network of communicating passages. It is an essential object of this invention to utilize these intercommunicating passages for providing all necessary electrical conduits, air ducts for heating, ventilating and cooling purposes, roof leaders, plumbing and other services required in the building. Thus in assembling the structure it is important that these services be passed through the intercommunicating passages in the framework as the framework is constructed.

Where it is desired to provide air diffusers in the heating and ventilating network these are provided by similarly cutting an aperture in bottom 27 of the channel portion 26 of a beam piece 25 at an appropriate location for the diffuser. The aperture can then be provided with a suitable louver to provide control of air flow. Similarly the electrical conduits brought through the various passages can include receptacle boxes at appropriate locations affixed to the bottom portions 27 which are apertured to receive the receptacle outlets. Plumbing, where this is required, can suitably be brought up through columns 11 and led off through beams 12 with appropriate openings made in beams 12 for connection to plumbing fixtures. Roof drains can be brought down straight through columns 11.

Figure 2 which illustrates the arrangement of the second floor level of building 10 schematically illustrates a typical such arrangement. In the arrangement shown in Figure 2 in order to separate certain services it is necessary to plug selected studs 18 of joint numbers 16. This is accomplished in any number of ways. Preferably a large neoprene plug is inserted into the selected stud 18 and cemented in position. In Figure 2 the location of the plugs is indicated by the reference numeral 41. Also in Figure 2 joint members are employed having only three and in some cases only two studs 18. The three studded joint members are indicated by the reference numeral 42 and the two studded joint members are indicated by the reference numeral 43.

In order to clarify further description it is also necessary to distinguish between the various beams in the structure of building 10. For the sake of simplicity the beams running from front to rear will be denoted by the superscripts ′, ″, and ‴, respectively, to denote their position from front to rear and by the postscripts $a$, $b$, $c$ and $d$ to denote their left to right positions, respectively. Similarly beams running from left to right will be denoted by the postscripts A, B and C to denote their respective left to right positions and by the added postscripts 1, 2, 3 and 4 to denote their front to rear positions, respectively. Thus, for example, beam 12 running from left to right at the extreme left and at the rear of the building is 12A4; while the beam running front to rear at the extreme right front of the building is $12d'$.

The same system of notation will be used to designate the various columns. In the case of the columns positioning in the front to rear, left row is denoted by the postscript A; positioning in the next row to the right by the postscript B; positioning in the second row to the right by the postscript C and positioning in the final row to the right by the postscript D. Similarly positioning in the left to right rows from front to back is designated by the postscripts $a$, $b$, $c$ and $d$ respectively. Thus the front right column is designated 11D$a$ for example.

In building 10 it is proposed to provide an air conditioning system for supplying both heating and cooling air, depending upon the heating or cooling demands, which includes four separate duct systems. The first system is supplied by employing column 11A$a$ as a riser from the air conditioning plant which feeds the hollow center of beam 12$a'$ as a distribution duct. In order to accomplish this in the joint 43 in column 11A$a$ a neoprene plug 41 is inserted in the stud 18 on which beam 12A1 rests. Also a neoprene plug 41 is inserted in the stud 18 of the joint element 42 on column 11A$b$ which receives beam 12$a'$, thus effectively segregating as a single unit column 11A$a$ and beam 12$a'$. This same arrangement is, of course repeated for the corresponding beam at the roof level and in that case the upper end of post 17 of the corresponding joint 43 at the roof is similarly plugged or capped. An air diffuser is provided in beam 12a', as indicated by the reference numeral 44, to supply heating or cooling air to the space between beams 12A1, 12a', 12A2 and 12b'. Columns 11Bc, 11Ca, and 11Dc are similarly arranged by suitable emplacement of plugs 41 to supply air to beams 12b'' and 12b''', to beam 12c' and to beams 12d'' and 12d'''. These beams are also provided on both sides with air diffusers 44, except in the case of beams 12d'' and 12d''' which are so provided on the interior side only to supply heating and cooling air for the remainder of the building.

Columns 11Ab, 11Bd, 11Cb and 11Dd were selected to provide roof drainage. Accordingly the joint members in these columns which were partly plugged with neoprene plugs 41 to segregate the air conditioning ducts are further plugged in all remaining studs 18 with neoprene plugs 41 to isolate the columns. Roof drainage, as will be described later, will be fed to these columns by gutters. The bases of the columns, of course, lead to conventional dry wells, sewers or the like.

In building 10 provision for electrical conduits does not require further segregation of the framework passageway system but does utilize separate columns for risers. For example, electrical conduits are brought up through column 11Ac from which they are extended into beams 12a'', 12A3 and 12a'''. These conduits, of course, can be extended into other beams if proper precautions are taken in passing through neoprene plugs 41, where necessary, since the electrical system can readily be carried through air conditioning ducts. Electrical conduits should not, however, be extended through roof leaders, such as column 11Ab or through the joint 42 in that column. Column 11Ba is similarly provided with electrical conduits which extend outwardly into beams 12A1, 12b' and 12B1. Again column 11Cc is provided with electrical riser conduits which are connected to receptacles located in beams 12c'', 12B3, 12c''' and 12C3. The last electrical riser conduit leads upwardly through column 11Da and leads to outlets distributed in beams 12C1 and 12D1.

Columns 11Ad, 11Bb, 11Cd and 11Db are reserved and can be used, where necessary, for plumbing.

It will be thus evident that the arrangement chosen provides a drainage conduit similar to a conventional roof leader in every fourth column, electrical service in every fourth column, air conditioning service in every fourth column and reserves every fourth column for other service. At the same time the arrangement assumes that every beam will carry panels and partitions separating each cubic space enclosed by connecting beams and columns. In this arrangement at least two beams in every such space carry electrical conduits in which electrical outlets can be appropriately made and every such space is provided with an air diffuser for heating and cooling purposes.

Figure 8 shows a fragment of the structure after partitions have been installed which illustrates more completely a typical roof leader, for example column 11Cb including portions of the beams 12 lying immediately over beams 12c' and 12C2 which for the sake of clarity have been so designated.

In the arrangement shown in Figure 8 it will be observed that the flange defined by sides 31 of a beam 12 immediately adjacent to the roof carries a channel 47, the bottom of which suitably is bolted to flanges 31 to secure channel 47 in position. Channels 47 are similarly provided over all roof beams 12 and are suitably provided with additional horizontally extended flanges 48, 49 on which roof slabs 14 are mounted such that each roof slab 14 spans over a square enclosed by four connecting beams 12. Thus in the roof, as can best be seen in Figure 1, a system of gutters is defined by channels 47. At the perimeter of the roof the outer side walls of gutter channel 47 are continuous and joints are suitably made leak-proof by use of flashing or sealing compounds. In each case at the juncture of gutter channels 47 where a drainage column 11 is not provided the upper portion of post 17 of the associated joint member 16, 42 or 43 is plugged and flashing is provided to prevent leakage at such joint. At the joints, however, over the joint members 16, 42 and 43 at the tops of columns 11Ab, 11Bd, 11Cb and 11Dd, the upper end of the associated post 17 of the joint member is cut down to the level of side portions 31 at the tops of the adjacent beams 12, and the ends of gutter channels 47 are bent, as indicated by the reference numeral 50, to lead into the upper end of the drainage column (roof leader). Flashing can suitably be employed here as well. Thus the entire roof area is drained through gutter channels 47 which lead to the drainage columns.

Figure 9:
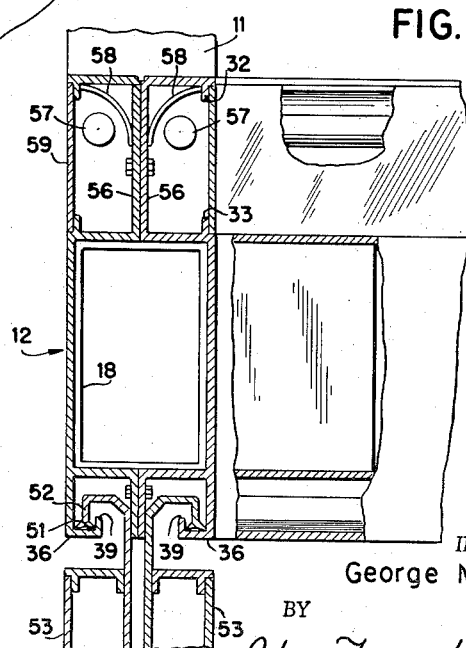
Figure 9 is a fragmentary vertical section through another portion of the structure of the building shown in Figure 1.

Referring again to Figure 8 and also to Figure 9, it will be observed that exterior panels and interior partitions can be readily supported between the beams and columns for either fixed or sliding operation. Thus at the bottom of each beam 12 the two angled portions 36 together with their associated bosses 39 define trackways 51 on which the sliding members 52 of sliding partitions 53 can be hung. If on the other hand a fixed partition or panel 54 is desired, the provision of a flange 55 about its periphery permits the panel to be bolted to flanges 20 or 21 of the columns 11 and to the flanges 35 of beams 12.

Another important feature of the present invention resides in the provision of perimeter lighting for each room enclosed in the manner described above. In particular referring to Figure 9 it will be observed that every beam 12 along each side near its top is provided with a recess 56 defined by angle 29 and the upper side wall 28 of channel portion 27 of the associated beam piece 25. Recesses 56 which function as light troffers suitably are provided with fluorescent light fixtures 57 running lengthwise along beams 12 behind which bowed reflectors 58 can be mounted and in front of which Lucite or glass panes 59 can be mounted resting on bosses 32 and 33. On the exterior sides of beams 12, of course, an aluminum strip is mounted over the recess 56 and resting on bosses 32 and 33 to improve the appearance of the building. Electrical connections to fluorescent fixtures 57 is suitably made from conduits extending in the various beams as described above. Switching arrangements can be mounted on the exposed corners of columns 11 in which electrical conduit risers run or by carrying switching lines down through such columns 11 as are reserved for other services or carry air ducts.

From the preceding description it will be apparent that the beam of the present invention from its shape and construction provides a sound structural support but at the same time provides an attractive appearing framework construction from an architectural standpoint and combines mechanical and electrical functions without detraction of structural and architectural values.

I claim:

A framework for a building or the like which includes a plurality of open-ended hollow upright columns, a plurality of beams, each said beam including an open-ended hollow central portion extending lengthwise thereof having generally a rectangular cross-section defining four faces thereon, a flange extending lengthwise centrally along one face of said central portion perpendicular to the plane of said face, a pair of flanges extending lengthwise along the edge of said first named flange remote from said central portion and on opposite sides of said first named flange perpendicular thereto, the outer edges of said pair of flanges terminating in the plane of the opposite faces of said central body portion adjacent to said one face whereby said first named flange, said pair of flanges and said one face of said central portion define troffers on opposite sides of said beam extending lengthwise thereof, a fourth flange extending lengthwise of said central portion centrally of the face thereof opposite said one face and perpendicular to said last named face, a pair of flanges extending lengthwise of said central portion, one along each edge of said last named face and perpendicular thereto and said fourth flange and each of said second named pair of flanges terminating at their edges remote from said central portion in a common plane parallel to said last named face, and a third pair of flanges one extending lengthwise of each of said second named pair of flanges perpendicular thereto along said edges remote from said central portion, said third pair of flanges extending toward said fourth flange, a plurality of hollow joint members, each said joint member including first means receiving an end of a said column with the hollow interior thereof in communication with the hollow interior of said joint member and second means receiving an end of a said beam with the hollow interior thereof in communication with the hollow interior of said joint member, said beams being positioned spanning between said columns forming a unitary framework structure with each joint member receiving an end of a said column on said first means and an end of a said beam on said second means whereby the hollow interiors of said beam and columns are in open communication thereby defining a plurality of intercommunicating passages within said framework, and panels including fixed panels and sliding panels, said fixed panels being mounted directly to said columns and beams and said sliding panels being hung on said third pair of flanges on said beams for sliding movement there along.

References Cited in the file of this patent

UNITED STATES PATENTS

| | | |
|---|---|---|
| 1,095,009 | Mallonee | Apr. 28, 1914 |
| 1,581,487 | Kohler | Apr. 20, 1926 |
| 1,984,355 | Abbott | Dec. 18, 1934 |
| 2,166,003 | Smith | May 3, 1938 |
| 2,691,718 | Bowers | Oct. 12, 1954 |
| 2,741,117 | Hoseason | Apr. 10, 1956 |
| 2,846,734 | Zitomer | Aug. 12, 1958 |

FOREIGN PATENTS

| | | |
|---|---|---|
| 8,399 | Great Britain | June 8, 1888 |
| 149,361 | Australia | Dec. 9, 1952 |